United States Patent
Saretto et al.

(10) Patent No.: US 9,597,599 B2
(45) Date of Patent: Mar. 21, 2017

(54) COMPANION GAMING EXPERIENCE SUPPORTING NEAR-REAL-TIME GAMEPLAY DATA

(75) Inventors: Cesare J. Saretto, Seattle, WA (US); Douglas C. Hebenthal, Bellevue, WA (US); Humberto Castaneda, Bellevue, WA (US); Kyle A. Pontier, Kirkland, WA (US); Justin M. Harrison, Seattle, WA (US); Andrew Everett Woods, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 536 days.

(21) Appl. No.: 13/527,187

(22) Filed: Jun. 19, 2012

(65) Prior Publication Data

US 2013/0337916 A1 Dec. 19, 2013

(51) Int. Cl.
*A63F 9/00* (2006.01)
*A63F 13/847* (2014.01)
*A63F 13/77* (2014.01)
*A63F 13/335* (2014.01)

(52) U.S. Cl.
CPC ............ *A63F 13/847* (2014.09); *A63F 13/77* (2014.09); *A63F 13/335* (2014.09); *A63F 2300/204* (2013.01); *A63F 2300/301* (2013.01); *A63F 2300/5533* (2013.01); *A63F 2300/609* (2013.01); *A63F 2300/6036* (2013.01)

(58) Field of Classification Search
USPC .......................................................... 463/32
See application file for complete search history.

(56) References Cited

U.S. PATENT DOCUMENTS

| | | | |
|---|---|---|---|
| 5,762,552 A | 6/1998 | Vuong et al. | |
| 7,927,216 B2 | 4/2011 | Ikeda et al. | |
| 8,092,287 B2 | 1/2012 | Purvis et al. | |
| 2003/0157985 A1* | 8/2003 | Shteyn ........................... 463/42 |
| 2004/0087363 A1* | 5/2004 | Bogenn .......................... 463/29 |
| 2004/0266529 A1* | 12/2004 | Chatani .................. A63F 13/12 463/40 |
| 2009/0055019 A1 | 2/2009 | Stiehl et al. | |
| 2009/0055204 A1 | 2/2009 | Pennington et al. | |
| 2009/0265105 A1 | 10/2009 | Davis et al. | |
| 2011/0319148 A1 | 12/2011 | Kinnebrew et al. | |

(Continued)

OTHER PUBLICATIONS

"Theatre of War 2 Gets Interactive Strategy Guide", Retrieved at <<http://pc.ign.com/articles/100/1002632p1.html>>, Retrieved Date : Mar. 2, 2012, pp. 4.

(Continued)

*Primary Examiner* — Seng H Lim
(74) *Attorney, Agent, or Firm* — Judy Yee; Micky Minhas

(57) ABSTRACT

A companion gaming experience is associated with a particular game title, but a user interface for the companion gaming experience is generated by a separate program from the associated game title and is presented on a device separate from the device on which the game user interface itself is presented. When an associated game of the video game title is not running, the companion gaming experience presents guide information and/or statistics data for the game title. However, when an associated game of the game title is running, the companion gaming experience presents gameplay data for the game in near-real-time.

20 Claims, 8 Drawing Sheets

(56) References Cited

U.S. PATENT DOCUMENTS

| | | | |
|---|---|---|---|
| 2012/0017236 A1* | 1/2012 | Stafford | A63F 13/00 |
| | | | 725/32 |
| 2012/0026166 A1* | 2/2012 | Takeda et al. | 345/419 |
| 2012/0044177 A1* | 2/2012 | Ohta | A63F 13/06 |
| | | | 345/173 |
| 2012/0052952 A1* | 3/2012 | Nishida | A63F 13/06 |
| | | | 463/37 |
| 2012/0165095 A1* | 6/2012 | Sato | A63F 13/10 |
| | | | 463/31 |
| 2012/0250980 A1* | 10/2012 | Gillard | H04N 5/2226 |
| | | | 382/154 |
| 2012/0270651 A1* | 10/2012 | Takeda | A63F 13/10 |
| | | | 463/31 |
| 2012/0302340 A1* | 11/2012 | Takemoto | A63F 13/10 |
| | | | 463/31 |

OTHER PUBLICATIONS

"Wii U", Retrieved at <<http://e3.nintendo.com/wiiu/>>, Retrieved Date: Jun. 13, 2012, pp. 5.

* cited by examiner

COMPANION GAMING EXPERIENCE SUPPORTING NEAR-REAL-TIME GAMEPLAY DATA

BACKGROUND

As technology has advanced, video games have become increasingly complex. Some video games have associated strategy guide books that outline strategies and techniques for users to employ when playing the games. While these strategy guide books can be useful, they are not without their problems. One such problem is that it can be difficult for users to absorb all of the information in these books, and easily use the information when playing their games.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first user interface for a companion gaming experience is presented at a first device when a game is being played on a second device. The first user interface includes gameplay data for the game in near-real-time. However, when the game is not being played on the second device, a second user interface for the companion gaming experience is presented at the first device. The second user interface includes guide information or statistics data for the game.

In accordance with one or more aspects, a companion gaming experience user interface is presented, at a first device, for a game played via a gaming user interface of a second device. This companion gaming experience user interface is generated by a program separate from a program that generates the gaming user interface. Based on near-real-time gameplay data from the game, the companion gaming experience user interface is updated to reflect the near-real-time gameplay data is generated or otherwise obtained. This updated companion gaming experience user interface is presented at the first device.

BRIEF DESCRIPTION OF THE DRAWINGS

The same numbers are used throughout the drawings to reference like features.

DETAILED DESCRIPTION

A companion gaming experience supporting near-real-time gameplay data is discussed herein. A companion gaming experience is associated with a particular game title, but a user interface for the companion gaming experience is generated by a separate program from the associated game title and is presented on a device separate from the device on which the game user interface itself is presented. Thus, a user can play the game on one device (e.g., a game console) and view the companion gaming experience on another device (e.g., a wireless phone or tablet computer). The companion gaming experience can serve as a strategy guide for the associated game title. When an associated game of the video game title is not running, the companion gaming experience presents guide information and/or statistics data for the game title. However, when an associated game of the game title is running, the companion gaming experience presents gameplay data for the game in near-real-time.

Figure 1:
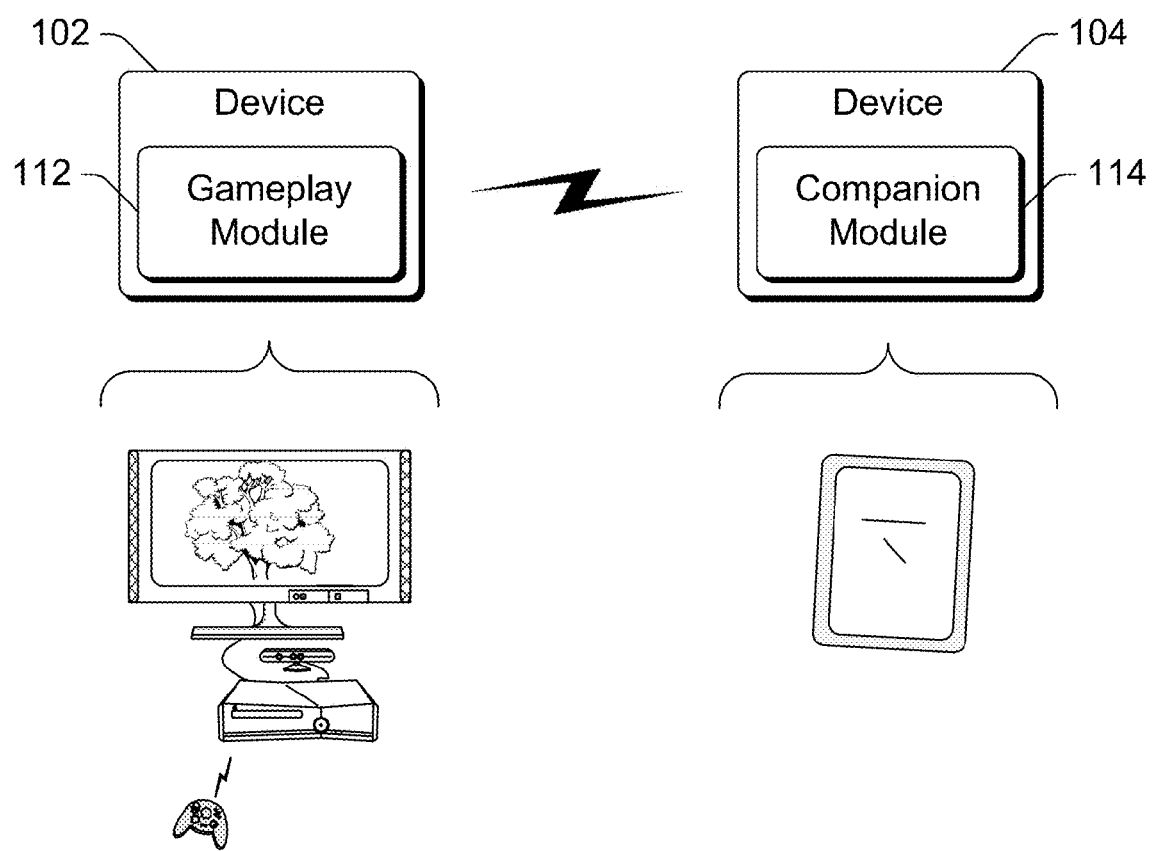
FIG. 1 illustrates an example system implementing the companion gaming experience supporting near-real-time gameplay data in accordance with one or more embodiments.

FIG. 1 illustrates an example system 100 implementing the companion gaming experience supporting near-real-time gameplay data in accordance with one or more embodiments. System 100 includes a device 102 and a device 104 that can communicate with one another in various manners. Devices 102 and 104 can communicate with one another directly or via one or more intermediary services, servers, and/or other devices. Devices 102 and 104 can communicate with one another via a variety of different networks, such as the Internet, a local area network (LAN), a wide area network (WAN), a personal area network (PAN), a phone network, an intranet, other public and/or proprietary networks, combinations thereof, and so forth. Devices 102 and 104 can alternatively communicate with one another using other wired and/or wireless communication mechanisms, such as a Universal Serial Bus (USB), wireless USB, infrared, other public and/or proprietary communication mechanisms, and so forth.

Device 102 is a device on which a video game is played by a user. In the illustrated example, device 102 is a game console coupled to a television. However, device 102 can be a variety of different types of devices. For example, device 102 can alternatively be a desktop computer, a server computer, a laptop or netbook computer, a tablet or notepad computer, a mobile station, an entertainment appliance, a set-top box communicatively coupled to a display device, a television or other display device, a cellular or other wireless phone, an automotive computer, and so forth.

Device 104 is a device on which a video game companion experience is presented to a user. In the illustrated example, device 104 is a tablet computer. However, device 104 can be a variety of different types of devices, analogous to the discussion above regarding device 102.

Devices 102 and 104 can each receive user inputs, which can be provided in a variety of different manners. User inputs can be provided by pressing one or more keys of a keypad or keyboard of a device 102 or 104, pressing one or more keys of a controller (e.g., remote control device, mouse, track pad, etc.) of a device 102 or 104, touching a particular portion of a touchpad or touchscreen of a device 102 or 104, positioning a finger or other object (or making a particular gesture with a finger or pointer) within a particular distance of a screen or controller, making a particular gesture on a touchpad or touchscreen of a device 102 or 104, and/or making a particular gesture on a controller (e.g., remote control device, mouse, track pad, etc.) of a device 102 or 104. User inputs can also be provided via other physical feedback input to a device 102 or 104, such as tapping any portion of a device 102 or 104, bending or twisting a device 104 or 104, an action that can be recognized by a motion detection component of a device 102 or 104 (such as shaking the device, rotating the device, etc.), and so forth. User inputs can also be provided in other manners, such as via voice or other audible inputs to a microphone, via motions of hands or other body parts observed by an image capture device, and so forth.

Different game titles can be played on device 102 (e.g., different sports game titles, different strategy game titles, different travel or searching game titles, and so forth). A game title refers to one or more programs that implement a game when run (e.g., one or more programs for a tennis game from a particular vendor, one or more programs for a car racing game from a particular vendor, etc.). Although discussed herein as one or more programs, it should be noted that a game title can be implemented at least in part in hardware, such as hardware of device 102 and/or another device (e.g., a server accessed via a network). Additionally, it should be noted that a game title can be implemented by one or more other sets of instructions that are a portion of a program or are otherwise not considered to be a program.

A particular running of a game title is also referred to as a game. Games can be run and played as single-player games in which a single user of a device 102 is playing the game and controlling one or more characters and/or objects in the game, with other characters and/or objects in the game being controlled by the game itself (these other characters and/or objects also being referred to as non-player-characters and/or non-player-objects). Games can also be run and played as multi-player games in which multiple users of one or more devices 102 are playing the same game title (and possibly game) and each user is controlling one or more characters and/or objects in the multi-player game. In multi-player games, users can play in various different game modes, including cooperatively (e.g., on the same side), competitively (e.g., against one another), and/or competitively on teams (e.g., teams of multiple users playing against one another). In multi-player games one or more additional characters can also be controlled by the game itself.

Device 102 includes a gameplay module 112 that presents a user interface, at device 102, for a particular game. Gameplay module 112 can include the one or more programs that implement the game and/or generate the gaming user interface, or alternatively the one or more programs that implement the game and/or generate the gaming user interface can be run on another device (such as a server accessed via a network) and that provides an indication to gameplay module 112 of the user interface to present for the game.

Device 104 includes a companion module 114 that presents a companion gaming experience user interface, at device 104, associated with the game for which gameplay module 112 presents the user interface. Analogous to gameplay module 112, companion module 114 can include one or more programs (or other sets of instructions and/or hardware) that implement and/or generate the companion gaming experience. Alternatively, the one or more programs (or other sets of instructions and/or hardware) that implement and/or generate the companion gaming experience can be run and/or implemented on another device (such as a server accessed via a network) that provides an indication to companion module 114 of the user interface to present for the companion gaming experience.

The companion gaming experience user interface is generated by one or more programs that are separate from the one or more programs that generate the gaming user interface. Gameplay module 112 and companion module 114 are also separate modules, being implemented as (or included in) different programs. The one or more programs that generate the companion gaming experience user interface being separate from the one or more programs that generate the gaming user interface refers to different programs generating the companion gaming experience user interface and the gaming user interface. Although the companion gaming experience and the game are associated with one another, the one or more programs generating the gaming user interface do not simply stream a user interface to companion module 114, and do not simply generate two different user interfaces (e.g., one for presentation by gameplay module 112 and one for presentation by companion module 114); rather, different programs are generating the companion gaming experience user interface and the gaming user interface. The companion gaming experience user interface can thus be used while the device implementing gameplay module 112 is powered off or while a game not associated with the companion gaming experience is being played on device 102. Additionally, the one or more programs that generate the companion gaming experience user interface and the one or more programs that generate the gaming user interface are not programs of the same game title; rather different programs are generating the companion gaming experience user interface and the gaming user interface.

Figure 2:
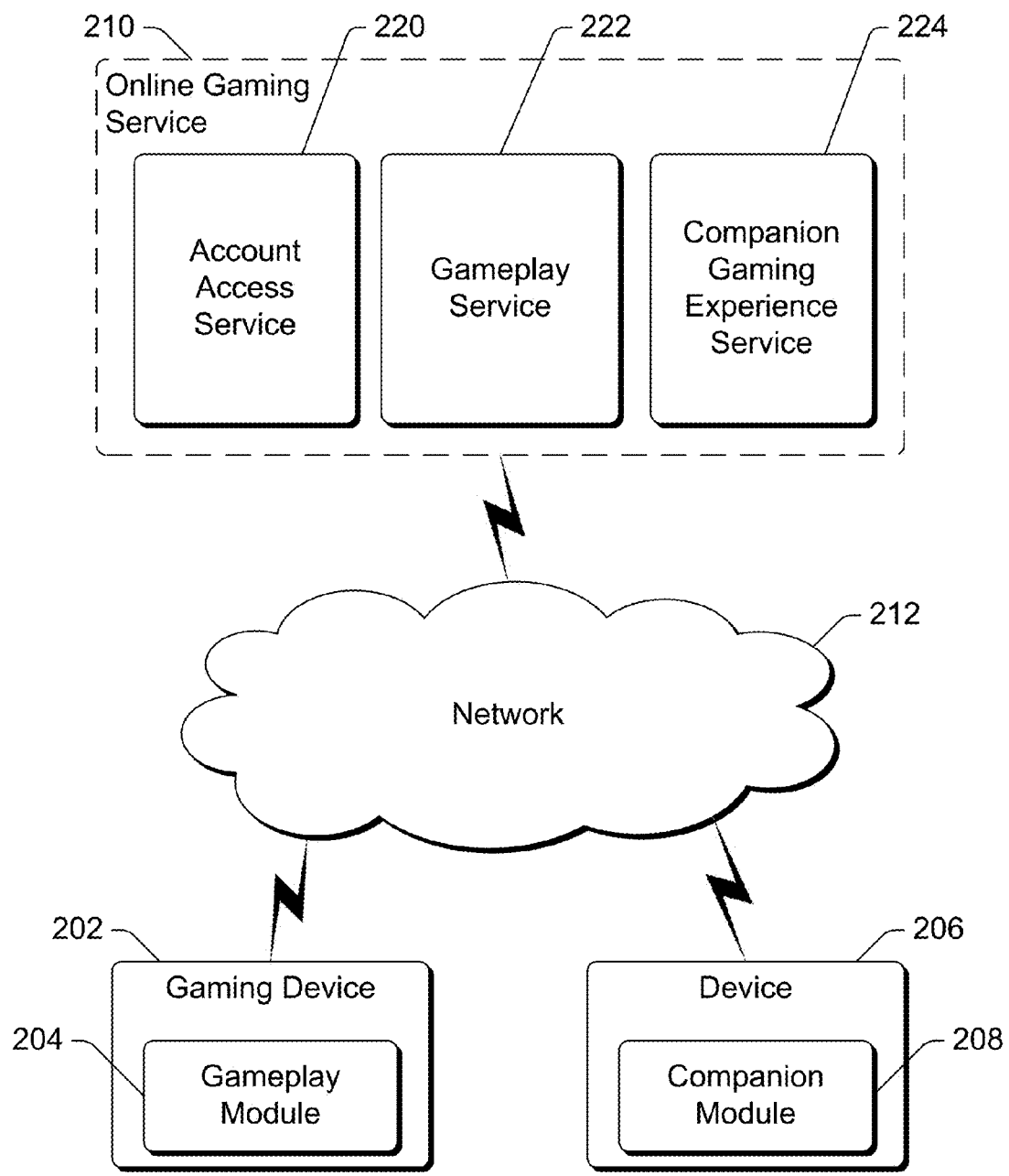
FIG. 2 illustrates another example system implementing the companion gaming experience supporting near-real-time gameplay data in accordance with one or more embodiments.

FIG. 2 illustrates an example system 200 implementing the companion gaming experience supporting near-real-time gameplay data in accordance with one or more embodiments. System 200 includes a gaming device 202, with a gameplay module 204, which can be a device 102 and gameplay module 112 of FIG. 1. System 200 also includes a device 206, with a companion module 208, which can be a device 104 and companion module 114 of FIG. 1. Devices 202 and 206 can communicate with an online gaming service 210 via a network 212. Network 212 can be a variety of different networks, including the Internet, a local area network (LAN), a wide area network (WAN), a personal area network (PAN), a phone network, an intranet, other public and/or proprietary networks, combinations thereof, and so forth.

Online gaming service 210 facilitates playing of one or more different games by a user of gaming device 202. Gaming service 210 is referred to as being an online service due to devices 202 and 206 accessing service 210 via network 212. Online gaming service 210 includes an account access service 220, a gameplay service 222, and a companion gaming experience service 224, each of which can communicate with one another. Services 220, 222, and 224 can communicate with one another within online gaming service 210 and/or via devices 202 and 206.

Account access service 220 provides various functionality supporting user accounts of online gaming service 210. Different users typically have different accounts with online gaming service 210, and can log into their accounts via account access service 220. A user or device logs into an account providing credential information, such as an ID (e.g., user name, email address, etc.) and password, a digital certificate or other data from a smartcard, and so forth. Account access service 220 verifies or authenticates the credential information, allowing a user or device to access the account if the credential information is verified or authenticated, and prohibiting the user or device from accessing the account if the credential information is not verified or is not authenticated. Once a user's credential information is authenticated, the user or device can use the other services provided by online gaming service 210. Account access service 220 can also provide various additional account management functionality, such as permitting changes to the credential information, establishing new accounts, removing accounts, and so forth.

Gameplay service 222 provides various functionality supporting playing of one or more different games by users of gaming devices 202. Different game titles can be supported by gameplay service 222 as discussed above. The one or more programs that implement a game can be run by gaming device 202 and/or gameplay service 222. Gameplay service 222 can also manage communication between gaming device 202 and other gaming devices, or facilitate establishing communication between gaming device 202 and other gaming devices.

Companion gaming experience service 224 provides various functionality supporting providing of a companion gaming experience by device 206. In one or more embodiments, companion gaming experience service 224 manages communication between gaming device 202 and device 206. In other embodiments, companion gaming experience service 224 facilitates establishing communication between devices 202 and 206. After communication between devices 202 and 206 is established, communication can be made between devices 202 and 206 without involving companion gaming experience service 224 or other services of online gaming service 210.

Each of services 220, 222, and 224 can be implemented using one or more computing devices. Typically these computing devices are server computers, but any of a variety of different types of computing devices can alternatively be used (e.g., any of the types of devices discussed above with reference to gaming device 102). Each of services 220, 222, and 224 can be implemented using different computing devices, or alternatively one or more of services 220, 222, and 224 can be implemented using the same computing device.

Additionally, although services 220, 222, and 224 are illustrated as separate services, alternatively multiple ones of these services can be implemented together as a single service. For example, gameplay service 222 and companion gaming experience service 224 can be implemented as a single service. Furthermore, the functionality of one or more of services 220, 222, and 224 can be separated into multiple services. In addition, the functionality of online gaming service 210 can be separated into multiple services. For example, online gaming service 210 may include account access service 220 and gameplay service 222, and a different service can include companion gaming experience service 224.

Figure 3:
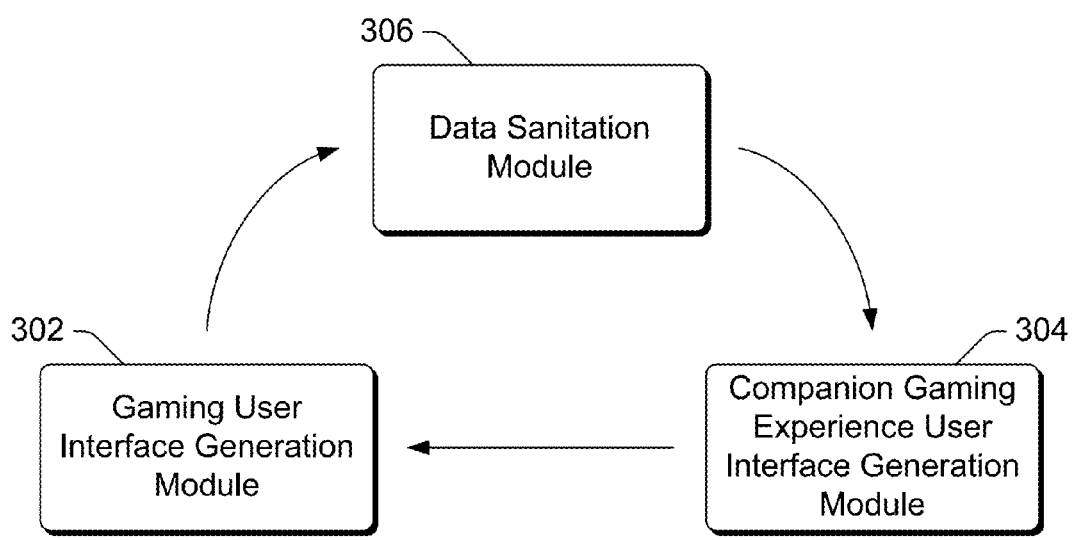
FIG. 3 illustrates another example system implementing the companion gaming experience supporting near-real-time gameplay data in accordance with one or more embodiments.

FIG. 3 illustrates an example system 300 implementing the companion gaming experience supporting near-real-time gameplay data in accordance with one or more embodiments. System 300 includes a gaming user interface generation module 302 that generates the gaming user interface presented by a gameplay module (e.g., presented by a gameplay module 112 of FIG. 1 or a gameplay module 204 of FIG. 2). System 300 also includes a companion gaming experience user interface generation module 304 that generates a companion gaming experience user interface associated with the game for which module 302 generates the user interface, and which is presented by a companion module (e.g., presented by a companion module 114 of FIG. 1 or a companion module 208 of FIG. 2).

Gaming user interface generation module 302 can send various gameplay data to companion gaming experience user interface generation module 304, and module 304 uses this gameplay data to generate the companion gaming experience user interface. The gameplay data refers to the presence and/or locations of various objects, items, and so forth in the game, including changes to such presence and/or locations as discussed in more detail below. Companion gaming experience user interface generation module 304 can also send various data to gaming user interface generation module 302, and module 302 can use this data in generating the gaming user interface. For example, user input changing the location of an object on a 2-dimensional (2D) map displayed in the user interface generated by module 304 can be sent to module 302, which in turn can change the location of that object in the 3-dimensional (3D) game space of the game. By way of another example, user input pausing the game may be received by module 304, and a pause indication sent to module 302 to pause the game. While the game is paused, changes can be made to the game (e.g., changing armor, changing weapons or other equipment, and so forth) via user input received by module 304, which are sent to module 302 and the game is updated accordingly. A user input to resume (un-pause) the game can then be received by module 304, and a resume indication sent to module 302 to resume playing the game. Thus, the user can pause the game and make changes to the game via a richer (e.g., touchscreen) graphical user interface of the companion module.

System 300 also includes a data sanitation module 306 that filters data sent from gaming user interface generation module 302 to companion gaming experience user interface generation module 304. Data sanitation module 306 can be included in at least one of one or more devices that implement gaming user interface generation module 302, in at least one of one or more devices that implement companion gaming experience user interface generation module 304, and/or in another at least one or more other devices (e.g., in one or more devices implementing companion gaming experience service 224 of FIG. 2). In one or more embodiments, gaming user interface generation module 302 provides more gameplay data than is desired to be provided to companion gaming experience user interface generation module 304. For example, module 302 may provide gameplay data, such as data including locations of other users in a game, that it is not desirable for module 304 to receive. In such situations, module 302 provides the gameplay data to data sanitation module 306. Data sanitation module 306 filters the data received from module 302, removing from the gameplay data any data that it is not desirable to have module 304 receive. Data sanitation module 306 then provides the filtered gameplay data to module 304.

Companion gaming experience user interface generation module 304 operates in two different modes, generating different user interfaces for presentation in the two different modes. Which mode module 304 operates in is based on whether a game associated with the companion gaming experience is being played by a user on another device. When an associated game is being played on another device, then module 304 operates in a gameplay mode in which gameplay data provided by gaming user interface generation module 302 is presented in near-real-time. However, when an associated game is not being played on another device, then module 304 operates in a guide mode in which other (non-gameplay data) is presented, such as guide information or statistics data for the game. Various different data that is not gameplay data can be presented in the guide mode, as discussed in more detail below.

Gameplay data being presented by the companion gaming experience in near-real-time refers to presenting the gameplay data shortly after the gameplay data is generated by the game so that the action of the game appears to a user playing the game to occur at approximately the same time as the gameplay data is presented by the associated companion gaming experience. The gameplay data is presented by the companion gaming experience user interface within a threshold amount of time (e.g., one second) of the gameplay data being generated by the game. This threshold amount of time can optionally vary based on the particular type of game. For example, the threshold amount of time for a fast-moving first-person shooter (e.g., one second) can be less than the threshold amount of time for a slower moving strategy board game (e.g., three seconds).

Returning to FIG. 2, in one or more embodiments gameplay data is provided by the game to online gaming service 210 at different intervals depending on whether companion module 208 is operating in gameplay mode, providing gameplay data more quickly if companion module 208 is operating in gameplay mode. For example, the game may provide gameplay data to online gaming service 210 every 10 seconds if module 208 is not operating in the gameplay mode, and every 1 second if module 208 is operating in the gameplay mode.

In one or more embodiments, online gaming service 210 exposes an interface via which companion module 208 can register for gameplay data updates for a specific user (e.g., logged into an account via device 206 and account access service 220). Device 206 registers with online gaming service 210 via this interface. In response to this registration, online gaming service 210 notifies the game (e.g., gameplay module 204) being played by that specific user (e.g., logged into the same account via gaming device 202 and account access service 220) to update gameplay data more frequently (e.g., every 1 second rather than every 10 seconds).

The gameplay data received at online gaming service 210 is sanitized (e.g., by data sanitation module 306 of FIG. 3), and a check made as to whether the sanitized gameplay data has been changed since the last sanitized gameplay data was sent to device 206. If the sanitized gameplay data has been changed since the last sanitized gameplay data was sent to device 206, then the sanitized gameplay data is sent to device 206. However, if the sanitized gameplay data is the same as the sanitized gameplay data that was last sent to device 206, then the sanitized gameplay data need not be sent to device 206. Thus, online gaming service 210 provides gameplay data to device 206 on a "need to know" basis.

Figure 4:
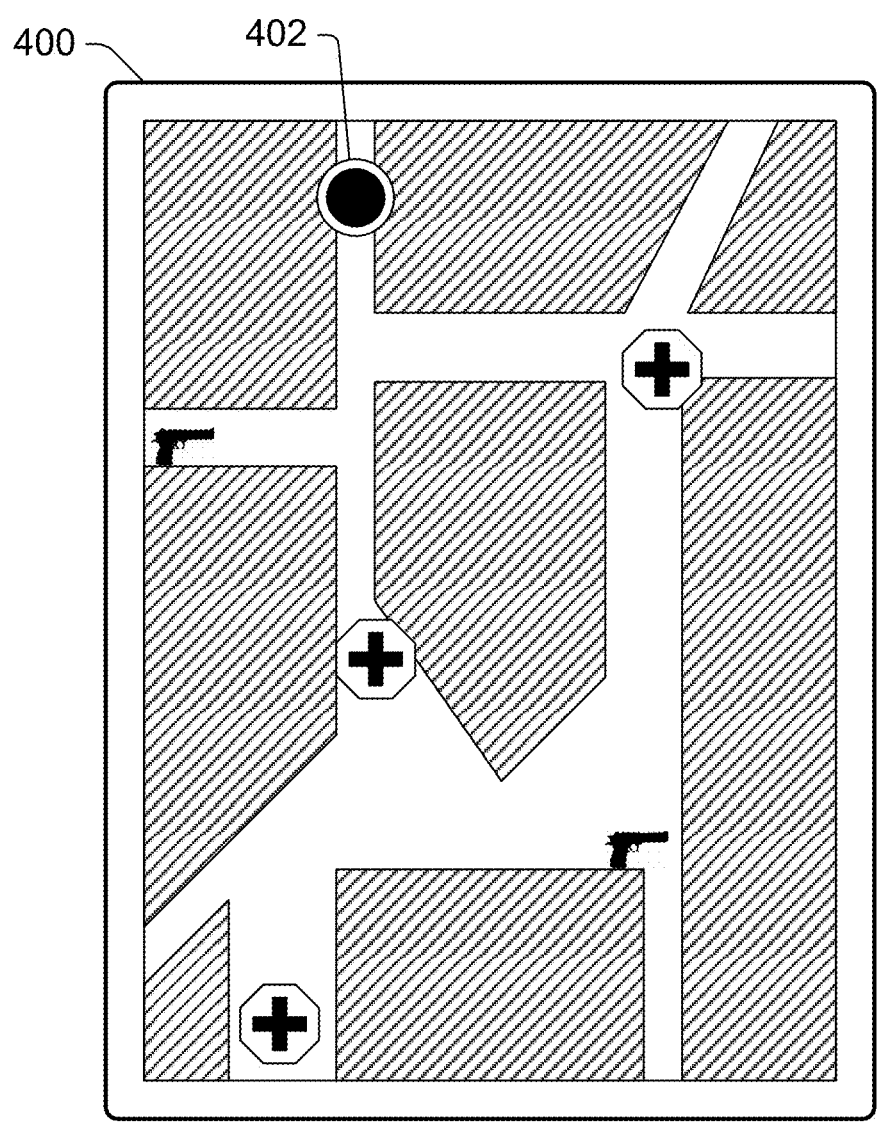
FIG. 4 illustrates an example user interface of a gameplay mode in accordance with one or more embodiments.

FIG. 4 illustrates an example user interface 400 of a gameplay mode in accordance with one or more embodiments. User interface 400 includes various gameplay data for the associated game. In the illustrated example of FIG. 4, a map is illustrated with various objects (illustrated with cross-hatching). Pathways between the various objects are also illustrated (shown with no cross-hatching). A current location of a user in the map is also illustrated by concentric circles 402. The locations of various additional items in the map are also illustrated, such as health packs (illustrated by a cross inside an octagon), and ammunition or weapons (illustrated by a gun).

The map displayed in user interface 400 is a 2D translation of the 3D game space of the game. The 2D translation of the 3D game space can be generated in various manners.

Figure 5:
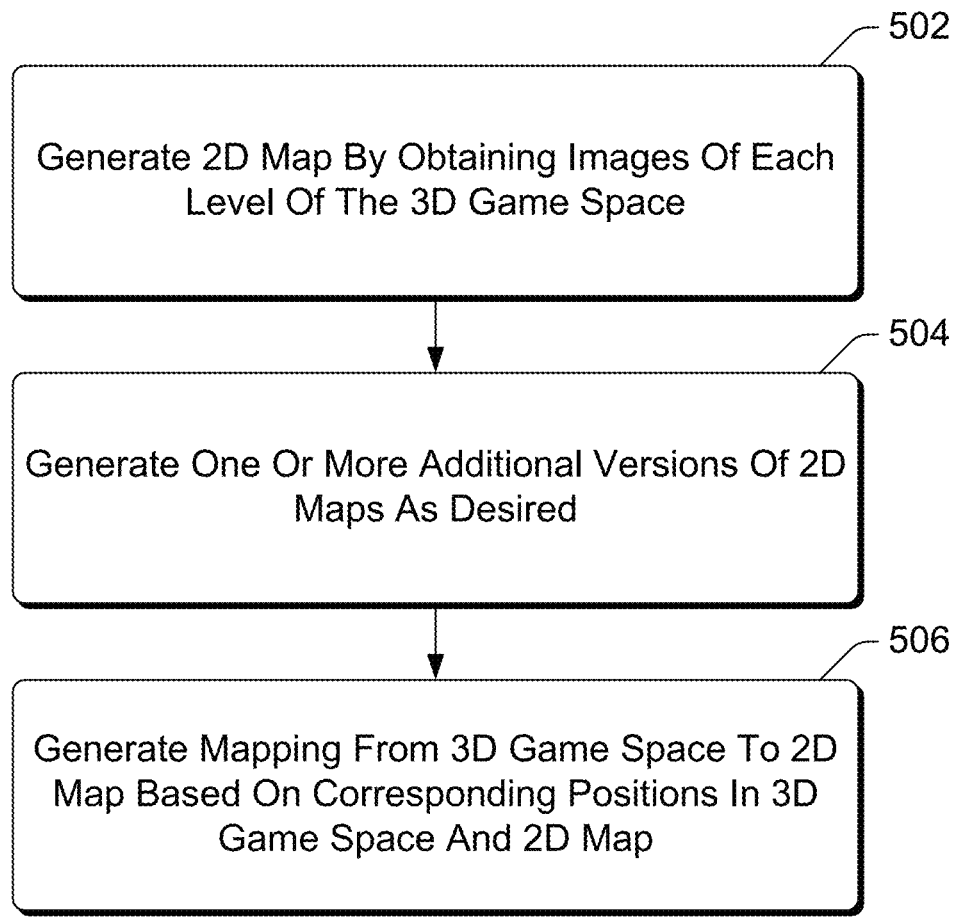
FIG. 5 is a flowchart illustrating an example process for creating a 2-dimensional translation of a 3-dimensional game space in accordance with one or more embodiments.

FIG. 5 is a flowchart illustrating an example process 500 for creating a 2D translation of the 3D game space in accordance with one or more embodiments. Process 500 can be carried out by a variety of different modules or devices, and can be implemented in software, firmware, hardware, or combinations thereof. Process 500 is shown as a set of acts and is not limited to the order shown for performing the operations of the various acts.

In process 500, a 2D map is generated by obtaining images of each level of the 3D game space (act 502). The images of a level of the 3D game space can be obtained in different manners. In one or more embodiments, the game space is accessed in a version of the game or using another application that allows a camera to be moved freely through the game space. The camera is moved overhead through each layer of the game space, capturing images or screenshots of the game space.

For example, the camera can start in the northwest corner of the game space and take a screenshot. The camera then moves east ⅔ of a camera view frustum at a time and takes a screenshot after each move of ⅔ of a camera view frustum. At the northeast corner of the game space, the camera moves south ⅔ of a camera view frustum and takes a screenshot. The camera then moves west ⅔ of a camera view frustum at a time and takes a screenshot after each move of ⅔ of a camera view frustum. This movement continues in a snake-like pattern until screenshots of the entire game space have been captured.

The screenshots of the game space are assembled into a single overhead image of the game space, which is a 2D map of the game space. Various different public and/or proprietary photo stitching techniques can be used to assemble these screenshots into the 2D map. If the game space includes multiple levels (e.g., multiple floors in a building, multiple levels or floors in a cave, etc.), this capturing of images or screenshots of the game space is repeated for each level, resulting in a 2D map for each level of the game space.

One or more additional versions of 2D maps are generated as desired (act 504). These additional versions are optional, and if generated are generated based on the 2D map generated in act 502. In one or more embodiments, the map generated in act 502 is referred to as an overhead map, and an illustrated map is also generated that can be displayed by the companion gaming experience in addition to or in place of the overhead map. The illustrated map is a version of the 2D map with a more artistic feel or look than the overhead map.

An illustrated map can be generated in different manners. In one or more embodiments, the illustrated map is generated using the overhead map as a template for an illustrated drawing. For example, the overhead map can be loaded into an illustration software package, and the illustrated map drawn over the overhead map. By using the overhead map as a template, the illustrated map has the same pixel dimensions as the overhead map, and helps ensure that illustrated elements are properly proportioned relative to the elements in the game space seen when playing the game.

A mapping from the 3D game space to the 2D map is generated based on corresponding positions in the 3D game space and the 2D map (act 506). A single mapping can be generated based on a single level of a single version of the map, and the single mapping used for all levels of all versions of the map. Alternatively, different mappings can be generated for different levels and/or different versions of the map.

In one or more embodiments, the mapping is a linear mapping and is generated as follows. Two positions in diagonal quadrants of the 2D map are identified (e.g., in the northwest and southeast quadrants of the 2D map). The positions are typically as far apart (or close to as far apart) as two positions can be on the 2D map (e.g., within a threshold distance of the northwest and southeast corners of the 2D map), and in which a player or object can be placed in the game. The X,Y pixel coordinates of these two positions are measured. The coordinates for one of the two positions are referred to as X1m,Y1m, and the coordinates for the other of the two positions are referred to as X2m,Y2m.

Using a debug or level editing version of the game, a player or other object is placed at each of these two positions in the 3D game space. The in-game X,Y coordinates of the player or object are measured using the debug or level editing features of the game. The coordinates for one of the two positions in the 3D game space are referred to as X1g,Y1g, and the coordinates for the other of the two positions in the 3D game space are referred to as X2g,Y2g.

Given the coordinates X1m,Y1m and X2m,Y2m in the 2D map, and the corresponding coordinates X1g,Y1g and X2g,Y2g in the 3D game space, a linear matrix transform can be readily determined to translate 3D game space coordinates to 2D map coordinates. The translated 2D map coordinates can be provided in different formats, such as coordinates for an absolute position (e.g., Xm,Ym) of the 2D map, as relative positions X',Y' (where X'=Xm/XM and Y'=Ym/YM, with Xm referring to the X coordinate of the absolute position of the 2D map, XM referring to the size of the 2D map in the X dimension, Ym referring to the Y coordinate of the absolute position of the 2D map, and YM referring to the size of the 2D map in the Y dimension), and so forth.

In one or more embodiments, different linear matrix transforms can be analogously determined for different versions of the 2D map (e.g., different versions having different resolutions), different levels of the 2D map (e.g., different levels having different resolutions), and so forth. Such different linear matrix transforms are determined as discussed above, with coordinates of positions in each of the different versions and/or levels of the 2D map.

Thus, given the location of a player or object in the 3D game space, the corresponding location of the player or object in the 2D map can be readily determined using the linear matrix transform. In situations in which the game space includes multiple different levels, an indication of a Z (height or depth) coordinate in the game space is evaluated to determine the proper level of the 2D map to display (and optionally which linear matrix transform to use). For example, if a building has two levels, then the transition point between the upper and lower level maps could be configured at the mid-point of the staircase between the levels. Thus, if the Z coordinate indicates the player or object is below the mid-point of the staircase, then the player or object is displayed in the lower level map; similarly, if the Z coordinate indicates the player or object is at or above the mid-point of the staircase, then the player or object is displayed in the upper level map.

Although the entire map for the game can be maintained by the companion gaming experience user generation module, alternatively map streaming is used by the companion gaming experience user generation module. When using map streaming, portions of the map are provided to the companion gaming experience user generation module as needed (e.g., from the gameplay module or a gameplay service) to display the appropriate portion of the map to the user. For example, if only 10% of the map is displayed at a particular time, then that 10% can be provided to the companion module with map streaming.

For map streaming, the map is read (e.g., from the gameplay module or a gameplay service) in small tiles that are retrieved on-demand. Tiles are pre-generated and stored in a collection known referred to as a tile set. Each tile can be a particular fixed number of pixels (e.g., 500×500 pixel tiles), or a relative number of pixels (e.g., each tile being 5% of the map). The tile set contains the entire map broken into tiles (e.g., squares or other geometric shapes) that are stitched together by the companion gaming experience user generation module. To enable zooming, the tile set contains the entire map repeated multiple times at different zoom levels. This allows a player to pan and zoom around the map quickly while streaming only the image data for the appropriate tiles (those being displayed at the particular zoom level) over the network.

In one or more embodiments, the companion gaming experience user generation module is designed to work with spaces that exist on spherical planets. The companion gaming experience user generation module shows 2D maps, but accounts for the 2D images to have been taken overhead via satellite, and thus skews these images (e.g., with Mercator projection). The companion gaming experience user generation module accounts for such skew by preventing the skewing from distorting the 2D maps significantly. The different versions and/or levels of the maps are broken into tile sets, and each version and/or level is placed on a sphere (e.g., the planet Earth) with the southwest corner of the map located at 0° latitude, 0° longitude. If the map is taller than wide, then the north edge of the map is fixed at 10° latitude and the west edge of the map is placed proportionately. If the map is wider than tall, then the west edge of the map is fixed at 10° longitude and the north edge of the map is placed proportionately. The northeast corner of the map is referred to as lat',lon'. This placement of the map near the Earth's Equator (bounded between 0°,0° and lat',lon') reduces the distortion from the skewing.

When a map is being displayed, players and other objects are placed in the map for display. The map can optionally be zoomed to an arbitrary size. Accordingly, the size of the of the map in pixels given the current map zoom level between 0°,0° and lat',lon' is determined. The current map zoom level is referred to as Xz pixels wide and Yz pixels tall. Accordingly, for 3D game space coordinates translated to 2D map coordinates X',Y', the location at which the player or object is placed in the current map zoom level is (Xz*X'), (Yz*Y').

Figure 6:
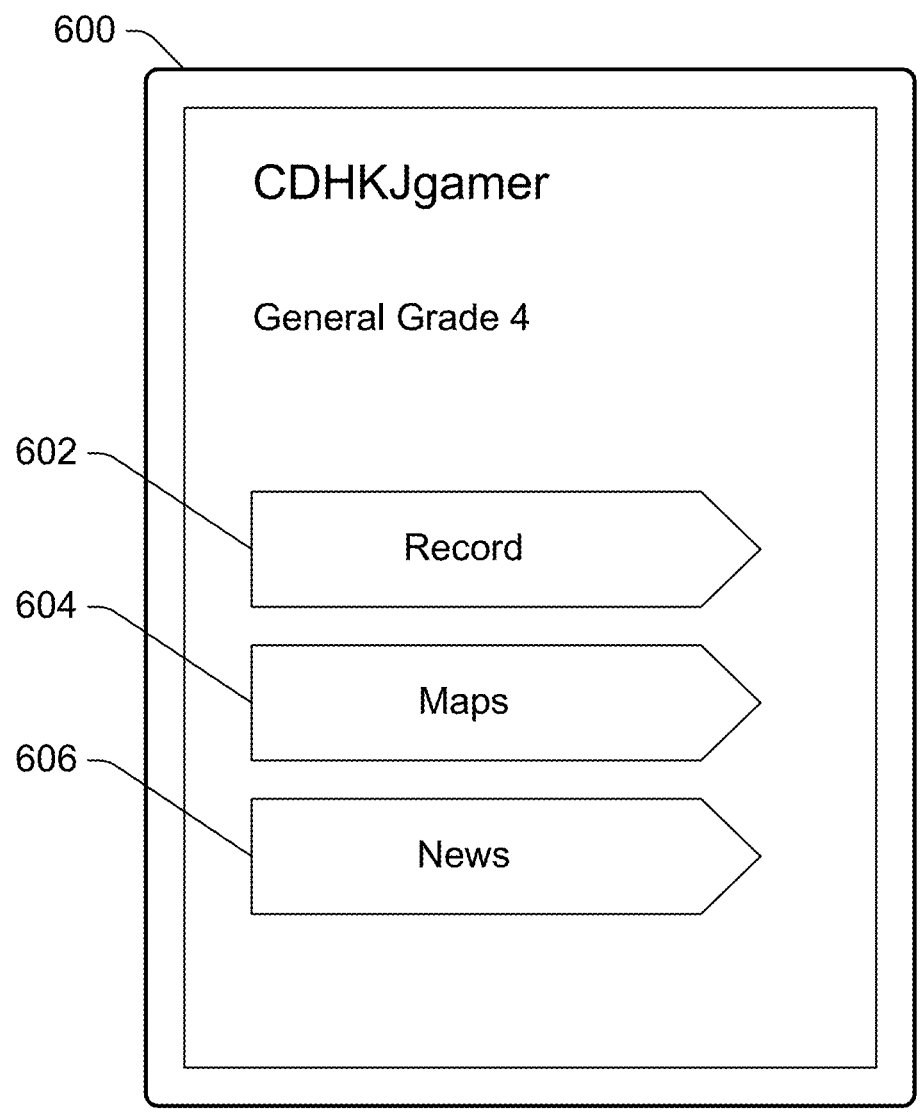
FIG. 6 illustrates an example user interface of a guide mode in accordance with one or more embodiments.

FIG. 6 illustrates an example user interface 600 of a guide mode in accordance with one or more embodiments. In the illustrated example of FIG. 6, various guide information or statistics data is illustrated. This guide information or statistics data includes an identifier of the user (e.g., a gamer tag), illustrated as "CDHKJgamer". A ranking of the user in the game is also included, illustrated as "General Grade 4". Three user-selectable buttons are also illustrated: record button 602, map button 604, and news button 606. These buttons 602-606 can be selected via any of a variety of different user inputs as discussed above, and in response to selection of a button 602-606 additional statistics data or other information is presented. Guide information, such as strategy information suggesting how the user can play the game, can also be included as part of user interface 600 (e.g., displayed in response to selection of news button 606 and/or an additional button (not shown)).

In response to user selection of record button 602, statistics information for the user is presented. Various statistics information based on the user's previous playing of the game can be presented, such as a number of games the user has played, a number of challenges or accomplishments the user has completed in the game, weapons or techniques and a frequency of their use by the user, and so forth. In response to user selection of maps button 604, one or more maps for the associated game are displayed. The user can optionally select which map is to be displayed, and switch between displays of different maps. These maps can identify various items and objects (e.g., as illustrated in user interface 400 of FIG. 4), but do not display a current location of a user in the map and do not present gameplay data updated in near-real-time because the user is not currently playing the associated game on another device. In response to user selection of news button 606, one or more news articles or items are presented. The user can optionally select which news article or item is presented, and switch between presentation of different news articles or items.

The various information or data presented in the guide mode can be obtained in various manners. For example, the information or data can be maintained by the companion gaming experience user interface generation module (e.g., module 304 of FIG. 3) and/or the companion module (e.g., module 114 of FIG. 1 or module 208 of FIG. 2) based on received gameplay data, the companion gaming experience user interface generation module (e.g., module 304 of FIG. 3) and/or the companion module (e.g., module 114 of FIG. 1 or module 208 of FIG. 2) can be pre-configured with the information or data, the information or data can be retrieved from an online gaming service (e.g., from gameplay service 222 or companion gaming experience service 224 of FIG. 2), and so forth.

It should be noted that some of the guide information or statistics data is associated with a particular user, and thus in one or more embodiments is illustrated only if that particular user is logged into his or her account (e.g., logged into an online gaming service (e.g., service 210)) via the companion gaming experience user interface. For example, the identifier of the user, ranking of the user, and record information can be displayed only if the user is logged into his or her account.

Returning to FIG. 3, the companion gaming experience is associated with a particular game title. Each companion gaming experience can thus be tailored to a particular game title, providing gameplay data, guide information, statistics data, and so forth as appropriate for the associated game title. In gameplay mode, the companion gaming experience is also associated with a particular game of a game title and/or a particular user. In one or more embodiments, the companion gaming experience is associated with a user that logs into his or her account on an online gaming service (e.g., service 210) via the companion gaming experience user interface presented by module 304 and/or a device implementing module 304. When the user also logs into the same account on online gaming service (e.g., service 210) via the user interface presented by gaming user interface generation module 302 and/or a device implementing module 302, the user is associated with both the game for which module 302 provides the user interface and the companion gaming experience for which module 304 provides the user interface. The game being played by the user when logged into the online gaming service is also associated with the companion gaming experience for which module 304 provides the user interface.

The companion gaming experience can also be associated with a particular game of a game title and/or a particular user in other manners rather than (or in addition to) being based on a user logging into an online gaming service. For example, two devices can communicate directly with one another (e.g., via wireless USB, infrared, etc.) and identify one another (e.g., using any of a variety of public and/or proprietary device discovery techniques). The companion gaming experience for which module 304 generates the user interface presented on one of these two devices is associated with the game for which module 302 generates the user interface presented on the other of these two devices.

Various different types of data can be presented as part of the companion gaming experience user interface in gameplay mode. These types of data can include map data, which identifies a map or environment in which the game is played. The map data can include locations of objects (e.g., buildings, walls, rocks, rivers, etc.), locations of items that can be viewed or acquired by a user (e.g., weapons, ammunition, clothing, health packs, vehicles, etc.), and so forth. These types of data can also include statistics information (e.g., statistics regarding the playing of a game), guide or strategy information (e.g., assisting a user with a particular challenge), and so forth. The types of data included in a map can vary based on the game title, the game, user-selected configuration options, and so forth.

It should be noted that some data can change over time as a game is played. For example, the locations of objects, items, and so forth can change as one or more users play a game. As the data changes, the gameplay data provided by gaming user interface generation module 302 to companion gaming experience user interface generation module 304 identifies these changes. The changes to the data are then presented by module 304. Thus, as data changes (e.g., items or objects move during gameplay), these changes (e.g., the new locations of items or objects that have moved) are reflected in the companion gaming experience user interface presented by module 304.

For example, referring again to FIG. 4, as the user moves through the game, the gaming user interface generation module provides gameplay data identifying that movement to the companion gaming experience user interface generation module. The companion gaming experience user interface generation module can then change the location of concentric circles 402 to reflect the user's movement. Additionally, the companion gaming experience user interface generation module can change the portion of the map that is displayed so that the objects and other items on the map change with the user's movement.

Furthermore, if a user were to pick up or use an item while playing the game, the gaming user interface generation module provides gameplay data identifying that item being picked or used to the companion gaming experience user interface generation module. The companion gaming experience user interface generation module then updates the companion gaming experience user interface generation module to reflect that that item is no longer available.

Returning to FIG. 3, it should also be noted that the data that is displayed, and whether particular data is displayed, in the companion gaming experience user interface can vary based on the particular game mode for a game. The game mode refers to a particular configuration or rules used for the game. Different game titles can support different game modes, such as different difficulty levels, playing as a single-user or multi-user game, playing competitively or cooperatively in a multi-user game, playing on a user-created map or on a game-provided map, and so forth.

One type of data presented as part of the companion gaming experience user interface is map data. The map or environment identified by the map data can be a building, arena, outdoor setting, and so forth. The game can include multiple different levels (e.g., floors in a building, platforms on a structure, etc.), and the map includes these different levels. Which level is displayed at different times can vary. For example, the level displayed at a particular time can be the level the user is on while playing the game at that particular time (as indicated in gameplay data provided by the gaming user interface generation module 302), the level displayed can be a user-selected level (e.g., selected via the companion gaming experience user interface), and so forth.

Map data can be obtained in various manners. For example, the game and/or companion gaming experience can be pre-configured with the map data, obtain the map data from an online service (e.g., companion gaming experience service 224 of FIG. 2), obtain the map data from the other (e.g., module 304 can obtain the map data as gameplay data from module 302), and so forth. The game and/or companion gaming experience can download and save map data, can stream the map data from an online service (e.g., companion gaming experience service 224 of FIG. 2) in response to user inputs (e.g., scrolling around the map, moving through the map during gameplay, and so forth).

The map data can include the location of various weapons, vehicles, and other in-game objects or items. The location of the objects or items can vary based on different game modes for the game, and can be configured in various manners (e.g., by user selection, via an online service such as online gaming service 210 of FIG. 2, by pre-configuration in the game design, and so forth). Whether the locations of the objects or items is displayed can vary based on different game modes. For example, the locations of all objects or items can be displayed for some game modes (e.g., when the user is playing cooperatively in a multi-user game, playing in a single-user game, playing a user-designed map, playing on an "easy" difficulty level, etc.), but the locations of only certain objects or items can be displayed for other game modes (e.g., locations of vehicles are not displayed when the user is playing competitively in a multi-user game, the locations of weapons are not displayed when the user is playing competitively in a multi-user game, etc.).

The map data can also include the location of various players in the game. These can be players controlled by other users in a multi-player game and/or players controlled by the game. As the locations of the players changes, these changes in locations are identified in gameplay data provided to module 304 as discussed above. The location of the user himself or herself is displayed on the map, and optionally the locations of other users (e.g., the other users' avatars, vehicles, etc.) in the game can also be displayed. Whether the locations of other users is displayed can vary based on different game modes. For example, the locations of all other users can be displayed for some game modes (e.g., when the user is playing cooperatively in a multi-user game, playing a user-designed map, etc.), but the locations of other users (or users on other teams) may not be displayed for other game modes (e.g., when the user is playing competitively in a multi-user game).

The map data can also include various equipment used by players in the game, whether those players are controlled by other users in a multi-player game and/or controlled by the game. The equipment includes various different items that can be used by a user, such as a weapon, vehicle, ammunition, clothing, and/or other in-game objects. The location of the equipment can vary based on different game modes for the game, and can be configured in various manners (e.g., by user selection, via an online service such as online gaming service 210 of FIG. 2, by pre-configuration in the game design, and so forth). Whether the locations of the equipment are displayed can vary based on different game modes. For example, the locations of all equipment can be displayed for some game modes (e.g., when the user is playing cooperatively in a multi-user game, playing in a single-user game, playing a user-designed map, etc.), but the locations of only certain equipment can be displayed for other game modes (e.g., locations of equipment of other users are not displayed when the user is playing competitively in a multi-user game, etc.).

Various other types of data can also be presented as part of the companion gaming experience user interface. One such type of data is game status data, with different types of status information being presented based on the particular game and/or game title. For example, the status data can include an overall score, multiple team scores, multiple individual scores, and so forth. The status data can include a roster of various players in a game, items or objects each player is equipped with, and so forth. The status data can include concepts such as medals earned by players or teams, the state of game objectives such as flags or rally points, and so forth. The status data can be a historical score of previous levels or matches recently played. The status data can be the user's progress towards meta-objectives, such as published daily/weekly challenges, user-created challenges, and so forth.

Another type of data that can be presented as part of the companion gaming experience user interface is strategy data. Different strategy information suggesting how the user can play the game can be presented to a user, such as suggestions (e.g., hints or tips) on how to traverse a particular obstacle or accomplish a particular task, suggested equipment to use for a particular level of a map or at a particular time, suggested item or object locations, and so forth. The strategy data can be obtained in different manners, such as being pre-configured in the companion gaming experience, being obtained from the game associated with the companion gaming experience, being obtained from an online service (e.g., companion gaming experience service 224 of FIG. 2) which can be pre-configured with the strategy data and/or obtain the strategy data from other users playing the game, and so forth.

The strategy data can vary based on different game modes for the game, and can be configured in various manners (e.g., by user selection, via an online service such as online gaming service 210 of FIG. 2, by pre-configuration in the game design, and so forth). Whether the strategy data is displayed can vary based on different game modes. For example, strategy data can be displayed for all difficulty levels or only particular difficulty levels (e.g., displayed when the game is played on "easy" difficulty levels but not displayed when the game is played on "hard" difficulty levels). By way of another example, the strategy data can be displayed for some game modes (e.g., when the user is playing cooperatively in a multi-user game, playing in a single-user game, playing a user-designed map, etc.), but not displayed for other game modes (e.g., strategy data is not displayed when the user is playing competitively in a multi-user game).

The strategy data can also vary based on the particular user and different games (or different game titles) the user has previously played. A record can be maintained (e.g., by companion gaming experience user interface generation module 304, by an online gaming service such as online gaming service 210 of FIG. 2, and so forth) of equipment or items the user frequently uses, particular types of tasks the user is more proficient at (e.g., completes challenges involving accurate shooting more frequently than completes challenges involving fast shooting), and so forth. This record can be used to determine which strategy data to display to the user. For example, if a particular challenge can be accomplished in a game using either an accurate shooting technique or a fast shooting technique, and the record indicates the user is more proficient at accurate shooting than at fast shooting, then the strategy data displayed to the user is the strategy data for using the accurate shooting technique.

Data sanitation module 306 filters gameplay data sent to companion gaming experience user interface generation module 304 as discussed above. In one or more embodiments, more gameplay data is provided by the game than is to be provided to module 304. The particular data that is filtered and thus not provided to module 304 can vary by game title, by game, by game mode, and so forth. For example, if the location of a player is not to be presented by the companion gaming experience user interface (e.g., due to the player being on another team than the user in a multi-user game), then data sanitation module 306 can filter the location of that player from the gameplay data provided to module 304. By way of another example, if the location of particular objects or items is not to be presented by the companion gaming experience user interface (e.g., due to the user playing competitively in a multi-user game, due to the user playing on a "hard" difficulty level), then data sanitation module 306 can filter the location of those particular objects or items (and changes to those locations) from the gameplay data provided to module 304.

In one or more embodiments, data sanitation module 306 allows companion gaming experience user interface generation module 304 to be implemented on systems that are less controlled or more open. For example, module 304 need not be implemented on a game console or other similarly controlled system that restricts which programs are run. Rather, module 304 can be implemented on more general purpose devices (e.g., tablet computers, wireless phones, etc.) without fear of data that module 304 is not to have access to (e.g., locations of other players in a competitive multi-user game) being made available to malicious programs or users of the device.

In one or more embodiments, data sanitation module 306 also reduces data bandwidth used by systems implementing companion gaming experience user interface generation module 304, allowing module 304 to be implemented on systems and/or networks with low data bandwidth capacity and/or allocating low data bandwidth to module 304. For example, data sanitation module 306 reduces the data received by module 304 so that data not used by module 304 need not be communicated to module 304.

In one or more embodiments, companion gaming experience user interface generation module 304 also receives user inputs and provides data to gaming user interface generation module 302 to affect the game. Although illustrated as providing the data to module 302, the data can alternatively be provided to a module presenting the user interface (which in turn can provide the data to module 302). Various different user inputs can be provided, such as user inputs that affect the map data. These user inputs can identify or change equipment, weapons, and/or other in-game objects or items. For example, a user input can change the load-out equipment for a user (e.g., weapons, ammunition, clothing, etc. that the user is equipped with when spawned). Data indicating the change in load-out equipment is provided to module 302, and used by module 302 to equip the user when the user is next spawned.

These user inputs received by companion gaming experience user interface generation module 304 can also iden-
tify courses to take, staging or rally points, challenges or goals to accomplish, and so forth. For example, a user input can identify a path to take through a particular map or a rally point at which multiple users (e.g., other players on the user team) are to meet. Data indicating this path or rally point is provided to module 302, which displays as part of the gaming user interface the path (e.g., displayed as a line in the user interface, displayed with arrows indicating a direction to go to stay on the path, etc.) or rally point. By way of another example, a user input can identify a particular challenge to accomplish (e.g., perform a particular task in less than a particular amount of time, accumulate a particular number of kills, and so forth). Data indicating this challenge is provided to module 302, which determines whether the challenge is accomplished (optionally providing as part of the gaming user interface status updates on how close to completion the challenge is) and awards the user with in-game currency or credit for accomplishing the challenge.

These user inputs received by companion gaming experience user interface generation module 304 can also identify changes to difficulty levels or other game modes. For example, a user input can be received to change from a "high" difficulty level to a "moderate" difficulty level. Data indicating this difficulty level change is provided to module 302, which changes the difficulty level of the game to the user indicated level.

In one or more embodiments, the user inputs received by companion gaming experience user interface generation module 304 can also be used to launch or begin playing of a game. The user interface generated by module 304 can identify different users, such as friends that the user frequently plays games with, other users that are also logged into the same online gaming service (e.g., online gaming service 210 of FIG. 2), and so forth. User inputs can be received selecting a particular one or more other users, and data indicating this selection provided to the online gaming service. The online gaming service then communicates with a module 302 on the user's device as well as a module 302 on each of the other users' devices to launch or begin running the game as a multi-user game including the user and the selected other users. Alternatively, modules of the user's device and the selected other users' devices can communicate with one another directly to launch the game rather than via the online gaming service.

Figure 7:
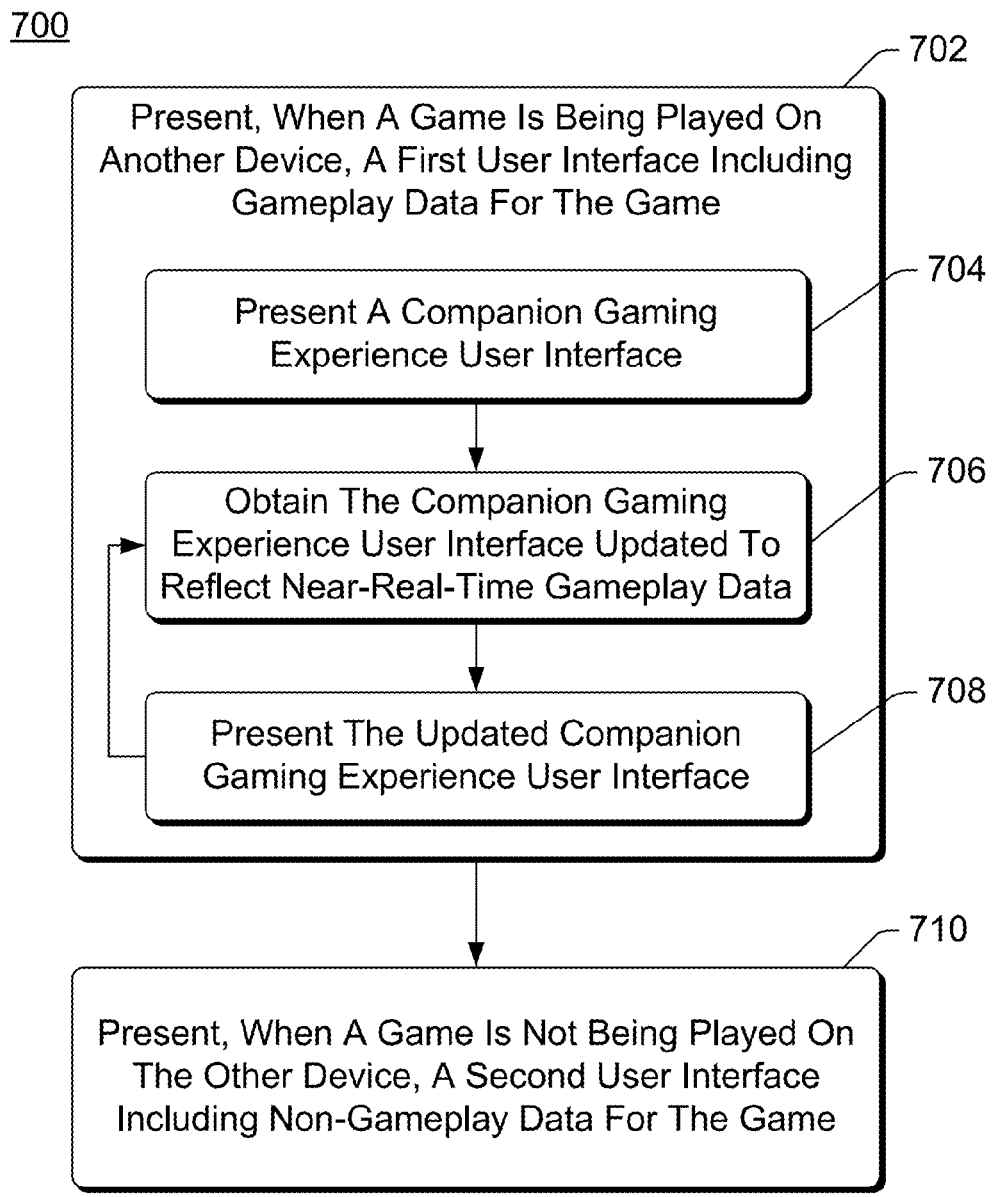
FIG. 7 is a flowchart illustrating an example process for implementing a companion gaming experience supporting near-real-time gameplay data in accordance with one or more embodiments.

FIG. 7 is a flowchart illustrating an example process 700 for implementing a companion gaming experience supporting near-real-time gameplay data in accordance with one or more embodiments. Process 700 is carried out by a module, such as module 114 of FIG. 1, module 208 of FIG. 2, or module 304 of FIG. 3, and can be implemented in software, firmware, hardware, or combinations thereof. Process 700 is shown as a set of acts and is not limited to the order shown for performing the operations of the various acts. Process 700 is an example process for implementing a companion gaming experience supporting near-real-time gameplay data; additional discussions of implementing a companion gaming experience supporting near-real-time gameplay data are included herein with reference to different figures.

In process 700, a first user interface for a companion gaming experience is presented when an associated game is being played on another device (act 702). The first user interface includes gameplay data for the game in near-real-time, as discussed above.

As part of presenting the first user interface, the companion gaming experience user interface is presented (act 704). The companion gaming experience user interface is generated by a program separate from a program that generates the gaming user interface for the game, as discussed above. The companion gaming user interface updated to reflect the near-real-time gameplay data is also obtained (act 706). The updated companion gaming user interface can be generated in act 706, or obtained from another module as discussed above. Regardless of how obtained, the updated companion gaming experience user interface is presented (act 708). Acts 706 and 708 are optionally repeated as additional gameplay data is received.

When the associated game is not being played on the other device, a second user interface is presented (act 710). The second user interface includes non-gameplay data such as guide information or statistics data for the game, as discussed above.

The companion gaming experience supporting near-real-time gameplay data techniques discussed herein support various different usage scenarios. For example, a user can play a video game on his or her game console, and have the companion gaming experience displayed on his or her tablet computer. Various strategy information can be displayed to the user by the companion gaming experience as the user plays his or her game. The user can also draw out a path that he or she desires to follow (e.g., by tracing a line through a map on a touchscreen of the tablet computer), and have that path displayed on the game interface presented by the game console.

By way of another example, a user can play a video game on his or her game console, and a friend in the same room can have the companion gaming experience displayed on his or her tablet computer. The friend can read strategy information displayed as part of the companion gaming experience as the user plays the game, change equipment loadouts, set up staging or rally points, and so forth. Thus, the companion gaming experience provides the user and his or her friend with a cooperative gaming feel, even though the friend is not playing the game on the game console.

Various actions such as communicating, receiving, sending, recording, generating, obtaining, and so forth performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 8:
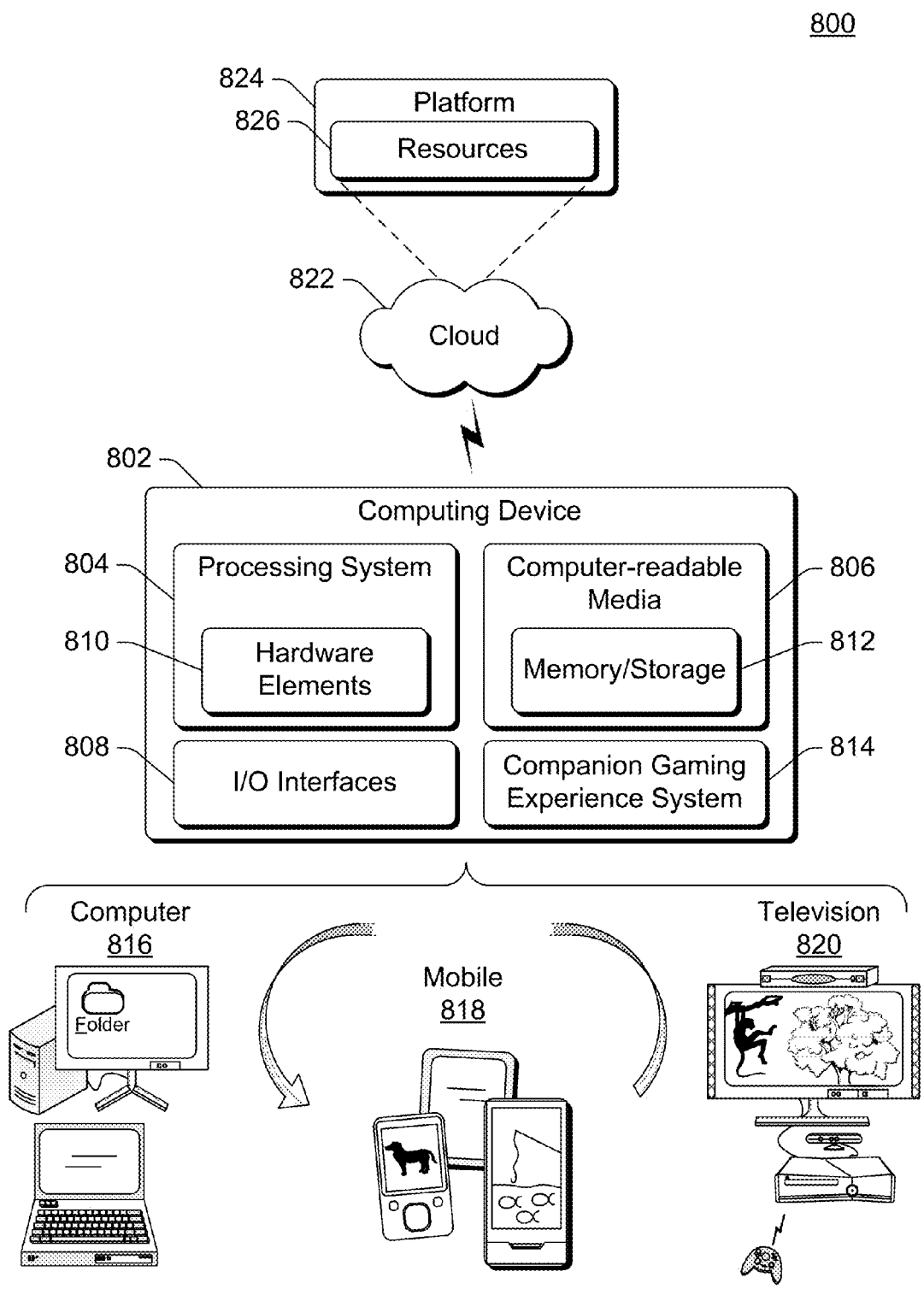
FIG. 8 illustrates an example system including an example computing device that may implement the various techniques described herein.

FIG. 8 illustrates an example system generally at 800 that includes an example computing device 802 that is representative of one or more computing systems and/or devices that may implement the various techniques described herein. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Computing device 802 also includes a companion gaming experience system 814. Companion gaming experience system 814 provides various companion gaming experience functionality as discussed above. Companion gaming experience system 814 can, for example, be a companion module 114 of FIG. 1, a companion module 208 of FIG. 2, or a companion gaming experience user interface generation module 304 of FIG. 3.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as an module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 816, mobile 818, and television 820 uses. Each of these configurations includes devices that may have generally different constructs and capabilities, and thus the computing device 802 may be configured according to one or more of the different device classes. For instance, the computing device 802 may be implemented as the computer 816 class of a device that includes a personal computer, desktop computer, a multi-screen computer, laptop computer, netbook, and so on.

The computing device 802 may also be implemented as the mobile 818 class of device that includes mobile devices, such as a mobile phone, portable music player, portable gaming device, a tablet computer, a multi-screen computer, and so on. The computing device 802 may also be implemented as the television 820 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 822 via a platform 824 as described below.

The cloud 822 includes and/or is representative of a platform 824 for resources 826. The platform 824 abstracts underlying functionality of hardware (e.g., servers) and software resources of the cloud 822. The resources 826 may include applications and/or data that can be utilized while computer processing is executed on servers that are remote from the computing device 802. Resources 826 can also include services provided over the Internet and/or through a subscriber network, such as a cellular or Wi-Fi network.

The platform 824 may abstract resources and functions to connect the computing device 802 with other computing devices. The platform 824 may also serve to abstract scaling of resources to provide a corresponding level of scale to encountered demand for the resources 826 that are implemented via the platform 824. Accordingly, in an interconnected device embodiment, implementation of functionality described herein may be distributed throughout the system 800. For example, the functionality may be implemented in part on the computing device 802 as well as via the platform 824 that abstracts the functionality of the cloud 822.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A first device comprising:
one or more processors; and
one or more computer-readable storage media having stored thereon multiple instructions of a first program that, when executed by the one or more processors, cause the one or more processors to:
present, at the first device when a game is currently being played by running a second program on a second device separate from the first device, the second program being separate from the first program, a first user interface for displaying a companion gaming experience, the first user interface including gameplay data for the game currently being played in near-real-time, the gameplay data including locations of in-game objects or in-game items on a map; and
present, at the first device when the game is not currently being played on the second device, a second user interface for displaying the companion gaming experience, the second user interface including non-gameplay data for the game.

2. A first device as recited in claim 1, the non-gameplay data including statistics information for a user's previous playing of the game.

3. A first device as recited in claim 1, the second device comprising a game console, and the first device comprising a tablet computer or wireless phone.

4. A first device as recited in claim 1, the map obtained by translating a 3D game space of the game to a 2D map, the 2D map being a map of one of multiple levels of the game space.

5. A first device as recited in claim 1, the locations of in-game objects or in-game items comprising a 3D game space location of the in-game objects or in-game items being translated to 2D map coordinates using a linear matrix transform.

6. A first device as recited in claim 1, the gameplay data including a location of a user playing the game on the map in which the game is played.

7. A first device as recited in claim 1, the gameplay data including a location of other users on the map in which the game is played.

8. A first device as recited in claim 1, the gameplay data including game status data for the game.

9. A first device as recited in claim 1, the gameplay data including strategy information suggesting how to play the game.

10. A first device as recited in claim 1, the multiple instructions further causing the one or more processors to:
receive, via the first user interface for the companion gaming experience, user input; and
provide, based on the user input, data to the second device to affect the game.

11. A first device as recited in claim 1, the gameplay data being received from an online gaming service and having been filtered, prior to being received by the first device, to remove data that is not to be presented as part of the first user interface for the companion gaming experience.

12. A method of providing a companion gaming experience, the method comprising:
presenting via a first program of a first of two devices, a companion gaming experience user interface for a game currently being played via a gaming user interface of a second of the two devices, the companion gaming experience user interface being generated by the first program separate from and communicatively coupled with a second program that generates the gaming user interface;
obtaining, based on near-real-time gameplay data from the game currently being played, the companion gaming experience user interface updated to reflect the near-real-time gameplay data including an updated indication of a location of one or more items in the game; and
presenting, via the first program at the first device, the updated companion gaming experience user interface.

13. A method as recited in claim 12, further comprising receiving user input and providing, based on the user input, data to the second device to affect the game.

14. A method as recited in claim 13, the user input being received from a user playing the game on the second device.

15. A method as recited in claim 12, the gameplay data being received from an online gaming service and having been filtered, prior to being received by the first device, to remove data that is not to be presented as part of the companion gaming experience user interface.

16. A method as recited in claim 12, the obtaining the updated companion gaming experience user interface comprising generating the updated companion gaming experience user interface.

17. A method as recited in claim 12, the companion gaming experience user interface including a portion of a map streamed to the first device, the map obtained by translating a 3D game space of the game to a 2D map.

18. A method as recited in claim 12, the near-real-time gameplay data including:
locations of in-game objects or items on a map in which the game is played;
a location of a user playing the game on the map;
a location of other users on the map; and
game status data for the game.

19. A method of providing a companion gaming experience at a first device, the method comprising:
presenting by a first program, at the first device when a game is currently being played by running a second program on a second device, the first and second devices being separate computing devices and the first and second programs being separate programs, a first user interface for the companion gaming experience, the first user interface including gameplay data for the game currently being played in near-real-time, the gameplay data including both a location of a user playing the game on a map in which the game is played and locations of in-game objects on the map; and presenting, at the first device when the game is not currently being played on the second device and the second device is powered off, a second user interface for the companion gaming experience, the second user interface including guide information or statistics data for the game, the statistics data including statistics information for the user's previous playing of the game.

20. A first device as recited in claim 1, the map obtained by translating the 3D game space of the game comprising a map obtained by capturing overhead images of the 3D game space of the game and using a photo stitching technique to generate the 2D map.

\* \* \* \* \*